United States Patent [19]

Valyocsik et al.

[11] Patent Number: 4,557,917
[45] Date of Patent: Dec. 10, 1985

[54] SYNTHESIS OF ZEOLITE ZSM-5 WITH ANIONIC ORGANIC COMPOUNDS

[75] Inventors: Ernest W. Valyocsik, Yardley, Pa.; Eric G. Derouane, Hopewell, N.J.

[73] Assignee: Mobil Oil Corporation, New York, N.Y.

[21] Appl. No.: 595,232

[22] Filed: Mar. 30, 1984

[51] Int. Cl.⁴ .............................................. C01B 33/28
[52] U.S. Cl. ..................................... 423/328; 423/329; 502/62
[58] Field of Search ................................ 423/326–333; 502/62, 77; 252/188.3 R

[56] References Cited

U.S. PATENT DOCUMENTS 3,313,594 4/1967 Wilson ................................. 423/329
3,702,886 11/1972 Argauer et al. ...................... 423/328
4,126,574 11/1978 Reinwald et al. ............... 423/328 X

FOREIGN PATENT DOCUMENTS 57-77023 5/1982 Japan ................................... 423/328

OTHER PUBLICATIONS

Hagiwara et al., "Chemistry Letters", 1981, pp. 1653–1656.

Primary Examiner—Edward J. Meros
Attorney, Agent, or Firm—Alexander J. McKillop; Michael G. Gilman; Marina V. Schneller

[57] ABSTRACT

An improved process for preparing ZSM-5 zeolite, and a product thereof, is disclosed. The process uses an organic anionic directing agent of the formula

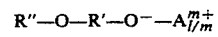

wherein A is a cation having a valence m, R' is an inorganic or an organic acid moiety, and R'' is a linear or branched aliphatic, aromatic or alkyl aromatic group. The ZSM-5 zeolite is synthesized at the $SiO_2/Al_2O_3$ molar ratios of 30 to 1000.

12 Claims, No Drawings

SYNTHESIS OF ZEOLITE ZSM-5 WITH ANIONIC ORGANIC COMPOUNDS

BACKGROUND OF THE INVENTION

1. Field of the Invention

This invention relates to an improved method of synthesizing a porous crystallin aluminosilicate zeolite ZSM-5.

2. Description of Prior Art

Zeolite materials, both natural and synthetic, have been demonstrated in the past to have catalytic properties for various types of hydrocarbon conversion. Certain zeolitic materials are ordered, porous crystalline aluminosilicates having a definite crystalline structure, as determined by X-ray diffraction pattern, within which there are a large number of smaller cavities which may be interconnected by a number of still smaller channels or pores. These cavities and pores are uniform in size within a specific zeolitic material. Since the dimensions of these pores are such as to accept for adsorption molecules of certain dimensions while rejecting those of larger dimensions, these materials have come to be known as "molecular sieves" and are utilized in a variety of ways to take advantage of these properties.

Such molecular sieves, both natural and synthetic, include a wide variety of positive ion-containing crystalline aluminosilicates. These aluminosilicates can be described as having a rigid three-dimensional framework of $SiO_4$ and $AlO_4$ in which the tetrahedra are cross-linked by the sharing of oxygen atoms whereby the ratio of the total aluminum and silicon atoms to oxygen atoms is 1:2. The electrovalence of the tetrahedra containing aluminum is balanced by the inclusion in the crystal of a cation, for example an alkali metal or an alkaline earth metal cation. This can be expressed by the relationship of aluminum to the cations, wherein the ratio of aluminum to the number of various cations, such as Ca/2, Sr/2, Na, K, Cs or Li, is equal to unity. One type of cation may be exchanged either entirely or partially with another type of cation utilizing ion exchange techniques in a conventional manner. By means of such cation exchange, it has been possible to vary the properties of a given aluminosilicate by a suitable selection of the cation. The spaces between the tetrahedra are occupied by molecules of water prior to dehydration.

Prior art techniques have resulted in the formation of a great variety of synthetic aluminosilicates. The aluminosilicates are usually designated by letter or other convenient symbols, as illustrated by zeolite A (U.S. Pat. No. 2,882,243), zeolite X (U.S. Pat. No. 2,882,244), zeolite Y (U.S. Pat. No. 3,130,007), zeolite ZK-5 (U.S. Pat. No. 3,247,195), zeolite ZK-4 (U.S. Pat. No. 3,314,752), zeolite ZSM-5 (U.S. Pat. No. 3,702,886), zeolite ZSM-11 (U.S. Pat. No. 3,709,979), zeolite ZSM-12 (U.S. Pat. No. 3,832,449), zeolite ZSM-20 (U.S. Pat. No. 3,972,983), zeolite ZSM-22 (U.S. patent application Ser. Nos. 373,451 and 373,452, both filed on Apr. 30, 1982), zeolite ZSM-23 (U.S. Pat. No. 4,076,842), ZSM-35 (U.S. Pat. No. 4,016,245), and ZSM-38 (U.S. Pat. No. 4,046,859).

The $SiO_2/Al_2O_3$ ratio of a given zeolite is often variable. For example, zeolite X can be synthesized with $SiO_2/Al_2O_3$ mole ratios of from 2 to 3; zeolite Y, from 3 to about 6. In some zeolites, the upper limit of the $SiO_2/Al_2O_3$ ratio is unbounded. ZSM-5 is one example of such zeolite wherein the $SiO_2/Al_2O_3$ ratio is at least 5, up to infinity. U.S. Pat. No. 3,941,871, now U.S. Pat. No. Re. 29,948, the entire contents of which are incorporated herein by reference, discloses a porous crystalline silicate zeolite made from a reaction mixture containing no deliberately added alumina in the recipe and exhibiting the X-ray diffraction pattern characteristic of ZSM-5 type zeolites. U.S. Pat. Nos. 4,061,724, 4,073,865 and 4,104,294, the entire contents of all three patents being incorporated herein by reference, describe crystalline silicates or organosilicates of varying alumina and metal content.

ZSM-5 has traditionally been synthesized with amines or quaternary ammonium compounds, used as organic templates in the synthesis. Such cationic templates are usually costly and some are not readily available on a commercial scale. In addition, they are not readily soluble in water and therefore the disposal of any unreacted portion thereof remaining after the synthesis is cumbersome and costly.

Recently, it was reported that ZSM-5 zeolites can be synthesized with anionic compounds, namely sodium n-dodecylbenzene sulfonate (SDBS), see Hagiwara et al, *Chemistry Letters*, No. 11, pages 1653–1656 (1981), published by the Chemical Society of Japan, and amides, Japanese Patent Application No. 81,160,315 of Dec. 10, 1981.

It is a primary object of the present invention to provide a method of synthesizing ZSM-5 zeolite in the presence of an anionic organic template.

This and other objects will become apparent to those skilled in the art from the following description of the invention.

SUMMARY OF THE INVENTION

In accordance with the present invention, there is provided a new method of preparing ZSM-5 zeolite, comprising synthesizing it from a reaction mixture comprising a source of an anionic organic compound, used as the organic template or the directing agent. The anionic organic compound contains a polar anionic group and a non-polar non-ionic group, and it is represented by the formula:

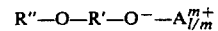

$$R''-O-R'-O^- -A^{m+}_{1/m}$$

wherein A is a cation having a valence m, R' is an inorganic or an organic acid moiety, and R'' is a linear or branched aliphatic, aromatic or alkyl aromatic group. Examples or R' are phosphates, sulfates, sulfonates or carboxylates, having one or two carboxyl groups, of R'' are phenols and other aromatic or aliphatic alcohols, e.g., alkyl and alkene alcohols, ethoxylated alcohols, ethoxylated alkyl and alkene phenols, and, of A are an alkali meal or an alkaline earth metal. In a preferred embodiment, A is sodium, potassium, cesium, calcium or magnesium, R' is a carboxylic acid moiety, and R'' is an ethoxylated alkyl group having 8 to 12 carbon atoms in the alkyl chain or an ethoxylated phenol alkyl group having 8 to 12 carbon atoms in the alkyl chain. In yet more preferred embodiment, A is sodium, R' is a sulfonated succinic acid group and R'' is either

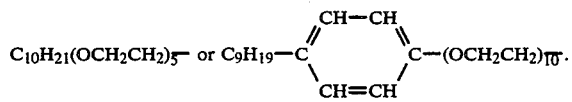

In the most preferred embodiment, A is sodium, R' is a sulfonated succinic acid group of the formula

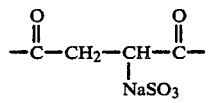

and R" is $C_{10}H_{21}(OCH_2CH_2)_5-$.

In addition to the anionic organic compound, the reaction mixture also comprises a source of silica, a source of alumina, a source of an alkali or alkaline earth metal, e.g., sodium, potassium, cesium or strontium, and water, and it has a composition, in terms of moles ratios of oxides of the respective ingredients, falling within the following ratios:

| REACTANTS | BROAD | PREFERRED | MOST PREFERRED |
|---|---|---|---|
| $SiO_2/Al_2O_3 =$ | 30–1000 | 40–500 | 60–90 |
| $H_2O/SiO_2 =$ | 2–1000 | 10–200 | 20–100 |
| $OH^-/SiO_2 =$ | 0–10 | 0.05–2 | 0.1–1 |
| $M^+/SiO_2 =$ | 0.01–3 | 0.05–1 | 0.10–0.8 |
| $R/SiO_2 =$ | 0.01–3 | 0.02–2 | 0.05–1 | wherein M is an alkali metal or an alkaline earth metal, and R is the anionic organic compound. Under certain process conditions, at the $SiO_2/Al_2O_3$ ratios of 500 to 1000, the crystallization of the reaction mixture yields a mixture of ZSM-5 zeolite and a crystalline material identified as ZSM-14. ZSM-14 is more fully identified in our copending, commonly-assigned application, Ser. No. 595,226, filed Mar. 30, 1984.

In calculating the mole ratio of hydroxide ions/silica, $OH^-/SiO_2$, it is conventional to calculate the amount of the hydroxide ions by summing the moles of $OH^-$, introduced into the solution, whether added as NaOH, as quaternary ammonium hydroxide (in the case of a conventional preparation), as sodium silicate ($NaOH+SiO_2$) as sodium aluminate ($NaOH+Al_2O_3$), or the like, and to subtract from that sum any moles of acid added. Moles of acid may be added in the form of individual acids, e.g., as HCl, $HNO_3$, $H_2SO_4$, acetic acid, or they may be added as salts, e.g., aluminum sulfate ($Al_2O_3+H_2SO_4$), aluminum chloride ($Al_2O_3+HCl$), aluminum nitrate ($Al_2O_3+HNO_3$). Each mole of $Al_2O_3$ is itself equivalent to 2 moles of acid in this calculation, since $Al_2O_3$ consumes 2 moles of hydroxide in its conversion to framework aluminate ion. In particular, no contribution or consumption of $OH^-$ by any acid which may be present is assigned to organic substances, such as amines or anionic organic compounds, in this calculation.

The present invention is also directed to a new form of ZSM-5 zeolite having the formula, in the anhydrous state, in the as-synthesized form, prior to calcination, in terms of mole ratios of oxides, per 100 moles of silica:
$(0.005-5)R_2O:(0.01-5)M_{2/n}O:(0.1-3.3)Al_2O_3:100SiO_2$
wherein R is the anionic organic compound, and M is an alkali metal or an alkaline earth metal having a valence n.

DETAILED DESCRIPTION OF THE INVENTION

Crystallization can be carried out at either static or stirred conditions in a reactor vessel, e.g., a polypropylene jar, teflon lined or stainless steel autoclaves, at about 100° C. to about 200° C. for about six (6) hours to about 60 days. Preferably, the crystallization temperature is maintained at about 150° to about 175° C., with the crystallization time at that temperature being from about twelve (12) hours to about eight (8) days. The ZSM-5 zeolite is prepared utilizing materials which supply the appropriate oxide. Such materials include sodium aluminate and alumina, as sources of alumina, sodium silicate, silica hydrosol, silica gel, silica acid, as sources of silica, sodium hydroxide, potassium hydroxide, magnesium hydroxide and calcium hydroxide, as sources of alkali metals or alkaline earth metals, and a source of the anionic organic compound. Suitable sources of oxides of the anionic organic compounds are aqueous solutions thereof, which may be commercially available, e.g., Aerosol A-102 and Aerosol A-103, both discussed below. In the preferred embodiment, the anionic organic compound is Aerosol A-102 or Aerosol A-103, both anionic surfactants which are half esters of sulfosuccinic acid (Aerosol A-102 and Aerosol A-103 are trademarks of, and are commercially available from, the American Cyanamid Company, Process Chemicals Department, Wayne, N.J. 07470). Aerosol A-102 is the most preferred organic directing agent.

In this connection, Aerosol A-102 and Aerosol A-103 have the following general chemical formula:

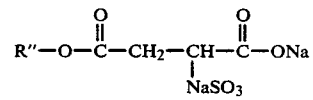

wherein, in Aerosol A-102, R" is $C_{10}H_{21}(OCH_2CH_2)_5-$, and in Aerosol A-103, R" is

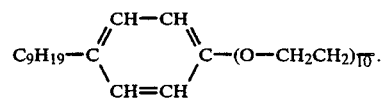

The reaction mixture is maintained at the synthesis conditions until crystals of ZSM-5 zeolite are formed. The solid crystals are then separated from the reaction mixture, e.g., by cooling the reaction mixture to room temperature, filtering out and water-washing the crystals.

The product crystals are then dried in a conventional manner, e.g., at 230° F. (110° C.), for about 8 to about 24 hours. It will be obvious to those skilled in the art that milder drying conditions, e.g., room temperature under vacuum, can also be employed.

As noted above, in the as-synthesized form, the ZSM-5 zeolite prepared in the process of the present invention has a calculated composition in terms of moles of oxides, after dehydration, per 100 moles of silica, as follows:
$(0.005-5)R_2O:(0.01-5)M_{2/n}O:(0.1-3.3)Al_2O_3:100SiO_2$
wherein R is the anionic organic compound, and M is an alkali metal or an alkaline earth metal having a valence n. In the above empirical formula for the as-synthesized ZSM-5 zeolite, it is understood that there must always be sufficient cations to completely balance the electrovalence of the lattice aluminum. In those instances wherein greater amounts of cations are present than are necessary to balance the aluminum charge, the excess amount of cations may be present in the zeolite in the form of occluded compounds or structural defects formed from these cations.

The ZSM-5 zeolite synthesized in accordance with the process of the present invention has the characteristics X-ray diffraction pattern of a ZSM-5 zeolite, the values of the significant lines of the latter being set forth below in Table I.

TABLE I

| Interplanar spacing d (Å): | Relative Intensity |
|---|---|
| 11.1 ± 0.2 | s. |
| 10.0 ± 0.2 | s. |
| 7.4 ± 0.15 | w. |
| 7.1 ± 0.15 | w. |
| 6.3 ± 0.1 | w. |
| 6.04 ± 0.1 | w. |
| 5.97 ± 0.1 | w. |
| 5.56 ± 0.1 | w. |
| 5.01 ± 0.1 | w. |
| 4.60 ± 0.08 | w. |
| 4.25 ± 0.08 | w. |
| 3.85 ± 0.07 | v.s. |
| 3.71 ± 0.05 | s. |
| 3.04 ± 0.03 | w. |
| 2.99 ± 0.02 | w. |
| 2.94 ± 0.02 | w. |

These values were determined by standard techniques. The radiation was the K-alpha doublet of copper, and a scintillation counter spectrometer with a strip chart pen recorder was used. The peak heights, I, and the positions as a function of 2 times theta, where theta is the Bragg angle, were read from the spectrometer chart. From these, the relative intensities, 100 I/$I_o$, where $I_o$ is the intensity of the strongest line or peak, and d (obs.) the interplanar spacing in A, corresponding to the recorded lines, were calculated. In Table I, the relative intensities are given in terms of the symbols s.=strong, m.=medium, m.s.=medium strong, m.w.=medium weak, and v.s.=very strong. It should be understood that this X-ray diffraction pattern is characteristic of all the species of ZSM-5 compositions. Ion exchange of the sodium ion with cations reveals substantially the same pattern with some minor shifts in interplanar spacing and variation in relative intensity. Other minor variations can occur, depending on the silicon to aluminum ratio of the particular sample, as well as if it had been subjected to thermal treatment.

The ZSM-5 zeolite prepared herein freely sorbs normal hexane and has a pore dimension greater than about 5 Angstroms. In addition, the structure of the zeolite must provide constrained access to larger molecules. It is sometimes possible to judge from a known crystal structure whether such constrained access exists. For example, if the only pore windows in a crystal are formed by 8-membered rings of silicon and aluminum atoms, then access by molecules of larger cross-section than normal hexane is excluded and the zeolite is not of the desired type. Windows of 10-membered rings are preferred, although, in some instances, excessive puckering or pore blockage may render these zeolites ineffective. Twelve-membered rings do not generally appear to offer sufficient constraint to produce the advantageous hydrocarbon conversions, although puckered structures exist such as TMA offretite which is a known effective zeolite. Also, such twelve-membered structures can be conceived that may be operative due to pore blockage or other causes.

Rather than attempt to judge from crystal structure whether or not a zeolite possesses the necessary constrained access, a simple determination of the "constraint index" may be made by passing continuously a mixture of an equal weight of normal hexane and 3-methylpentane over a sample of zeolite at atmospheric pressure according to the following procedure. A sample of the zeolite, in the form of pellets or extrudates, is crushed to a particle size about that of coarse sand and mounted in a glass tube. Prior to testing, the zeolite is treated with a stream of air at 1000° F. for at least 15 minutes. The zeolite is then flushed with helium and the temperature adjusted to between about 550° F. (288° C.) and about 950° F. (510° C.) to give an overall conversion between 10% and 60%. The mixture of hydrocarbons is passed at a 1 liquid hourly space velocity (LHSV), i.e., 1 volume of liquid hydrocarbon per volume of zeolite per hour, over the zeolite with a helium dilution to give a helium to total hydrocarbon mole ratio of 4:1. After 20 minutes on stream, a sample of the effluent is taken and analyzed, most conveniently by gas chromatography, to determine the fraction remaining unchanged for each of the two hydrocarbons.

The "constraint index" is calculated as follows:

$$\text{Constraint Index} = \frac{\log_{10}(\text{fraction of n-hexane remaining})}{\log_{10}(\text{fraction of 3-methylpentane remaining})}$$

The constraint index approximates the ratio of the cracking rate constants for the two hydrocarbons. The ZSM-5 zeolite has a constraint index of about 8.3 at 800° F. (427° C.). Constraint Index (CI) values for some other typical zeolites are:

| Zeolite | C.I. |
|---|---|
| ZSM-11 | 8.7 |
| ZSM-12 | 2 |
| ZSM-23 | 9.1 |
| ZSM-38 | 2 |
| ZSM-35 | 4.5 |
| Clinoptilolite | 3.4 |
| TMA Offretite | 3.7 |
| Beta | 0.6 |
| ZSM-4 | 0.5 |
| H-Zeolon | 0.4 |
| REY | 0.4 |
| Amorphous Silica-Alumina (non-zeolite) | 0.6 |
| Erionite | 38 |

It is to be realized that the above constraint index values typically characterize the specified zeolites but that these are the cumulative result of several variables used in determination and calculation thereof. Thus, for a given zeolite depending on the temperature employed within the aforesaid range of 550° F. to 950° F., with accompanying conversion between 10% and 60%, the constraint index may vary within the indicated approximate range of 1 to 12. Likewise, other variables such as the crystal size of the zeolite, the presence of possible occluded contaminants and binders intimately combined with the zeolite, may affect the constraint index. It will accordingly be understood by those skilled in the art that the constraint index, as utilized herein, while affording a highly useful means for characterizing the zeolites of interest is an approximation, taking into consideration the manner of its determination, with probability, in some instances, of compounding variable extremes.

While the above experimental procedure will enable one to achieve the desired overall conversion of 10 to 60% for most catalyst samples and represents preferred conditions, it may occasionally be necessary to use somewhat more severe conditions for samples of very low activity, such as those having a very high silica to alumina mole ratio. In those instances, a temperature of up to about 1000° F. and a liquid hourly space velocity of less than one, such as 0.1 or less, can be employed in order to achieve a minimum total conversion of about 10%.

The present method of synthesizing ZSM-5 zeolite is more economical than the conventional previously-used syntheses methods because the anionic organic compounds or templates used in the synthesis method of the present invention are commercially available in bulk quantities at a relatively low cost, and because the organic anionic templating agents used herein are highly water soluble and therefore can be easily disposed of at a reasonable cost. Organic cationic templates, such as quaternary ammonium compounds, heretofore conventionally used in ZSM-5 synthesis, usually were not commercially available, and their by-products were not easily soluble in water, both of which factors contributed to the high cost of manufacturing of ZSM-5 zeolite. In addition, Aerosol A-102 and Aerosol A-103, the preferred directing agents of the present invention, appear to be non-toxic, e.g., non-dermatitic.

The original cations and anions of the as-synthesized ZSM-5 can be replaced in accordance with techniques well known in the art, at least in part, by ion exchange with other ions. Preferred replacing cations include metal ions, ammonium ions, hydrogen ions and mixtures thereof. Particularly preferred cations are those which render the zeolite catalytically active, especially for hydrocarbon conversion. These include hydrogen, rare earth metals, aluminum metals of Groups IIA, IIIB, IVB, VIB, VIII, IB, IIB, IIIA and IVA. Of the replacing metallic cations, particular preference is given to cations of metals, such as rare earth metals, Mn, Ca, Mg, Zn, Cd, Pd, Ni, Co, Ti, Al, Sn, Fe and Cu. Preferred replacing anions include halides, nitrates, sulfates, bicarbonates, acetates and oxalates.

A typical ion exchange technique comprises contacting the synthetic ZSM-5 zeolite with a salt of the desired replacing anions or cations. Although a wide variety of salts can be employed, particular preference is given to the chlorides, nitrates and sulfates.

Representative ion exchange techniques are disclosed in a wide variety of patents including U.S. Pat. Nos. 3,140,249, 3,140,251 and 3,140,253, the entire contents of which are incorporated herein by reference. The cations and the anions of the as-synthesized ZSM-5 zeolite of the present invention can be replaced in accordance with the teachings of the aforementioned patents.

Following contact with the salt solution of the desired replacing cation or anion, the zeolite is preferably washed with water and dried at a temperature ranging from about 150° F. to about 600° F. and thereafter may be calcined in air or other inert gas at temperatures ranging from about 500° F. to 1500° F. for periods of time ranging from 1 to 48 hours or more to produce a catalytically-active thermal decomposition product thereof.

Regardless of the ion replacing the cations or anions in the as-synthesized form of the ZSM-5, the spatial arrangement of the aluminum, silicon and oxygen atoms which form the basic crystal lattices of ZSM-5 remains essentially unchanged by the described replacement of the original anions and cations as determined by taking an X-ray powder diffraction pattern of the ion-exchanged material.

The hereby-prepared zeolite ZSM-5 may be used in a wide variety of organic compound conversion processes, e.g. hydrocarbon compounds and oxygenates, such as methanol conversion. Such processes include, for example, alkylation of aromatics with olefins, aromatization of normally gaseous olefins and paraffins, aromatization of normally liquid low molecular weight paraffins and olefins, isomerization of aromatics, paraffins and olefins, disproportionation of aromatics, transalkylation of aromatics, oligomerization of olefins and cracking and hydrocracking.

Synthetic ZSM-5 zeolites prepared in accordance with this invention can be used either in the organic anion-containing or alkali metal form and hydrogen form or another univalent or multivalent cationic form. They can also be used in intimate combination with a hydrogenating component such as tungsten, vanadium, molybdenum, rhenium, nickel, cobalt, chromium, manganese, or with a noble metal, such as platinum or palladium, where a hydrogenation-dehydrogenation function is to be performed. Such components can be exchanged into the composition, impregnated therein or physically intinately admixed therewith. Such components can be impregnated in or on to ZSM-5, such as, for example, by, in the case of platinum, treating the zeolite with a platinum metal-containing ion. Suitable platinum compounds for this purpose include chloroplatinic acid, platinous chloride and various compounds containing the platinum amine complex. Combinations of metals and methods for their introduction into the zeolite can also be used.

The ZSM-5 zeolite prepared in accordance with the synthesis method of the present invention tends to form crystalline particles of a relatively large size, i.e., about 4–6 microns ($\mu$). In addition, there is also a tendency for smaller size crystals (about $0.5\mu$) to crystallize on the surface of the large size crystals. However, under certain conditions, increasing the concentration of the anionic template suppresses the crystallization of the smaller size crystals (see Examples below).

In the case of many catalysts, including the ZSM-5 zeolite, it is desired to incorporate the new crystal with another material resistant to the temperatures and other conditions employed in organic conversion processes. Such materials include active and inactive materials and synthetic or naturally occurring zeolites as well as inorganic materials, such as clays, silica and/or metal oxides. The clays, silica and/or metal oxides may be either naturally occurring or in the form of gelatinous precipitates or gels including mixtures of silica and metal oxides. The use of such an additional active material in conjunction with the ZSM-5 crystal, i.e., combined therewith, tends to improve the conversion and/or selectivity of the catalyst in certain organic conversion processes. Inactive materials suitably serve as diluents to control the amount of conversion in a given process, so that conversion products can be obtained economically and orderly without employing other means for controlling the rate of reaction. These materials may be incorporated into naturally occurring clays, e.g., bentonite and kaolin, to improve the crush strength of the catalyst under commercial operating conditions. Such materials, e.g., clays or oxides, function as binders for the catalyst. It is desirable to provide a catalyst having good crush strength because in commercial use it is desirable to prevent the catalyst from beaking down into powder-like materials. These clay binders are normally employed for the purpose of improving the crush strength of the catalyst, and they can be employed to perform the same function in combination with the ZSM-5 zeolite of the present invention.

Naturally occurring clays which can be composited with the ZSM-5 zeolite of this invention include the montmorillonite and kaolin family, which families include the subbentonites, and the kaolins commonly known as Dixie, McNamee-Georgia and Florida clays or others in which the main mineral constituent is halloysite, kaolinite, dickite, nacrite, or anauxite. Such clays can be used in the raw state as originally mined or initially subjected to calcination, acid treatment or chemical modification. Binders useful for composing with the ZSM-5 crystal of this invention also include inorganic oxides, notably alumina.

In addition to the foregoing materials, the ZSM-5 zeolite can be composited with a porous matrix material such as silica-alumina, silica-magnesia, silica-zirconia, silica-thoria, silica-beryllia, silica-titania, as well as ternary compositions such as silica-alumina-thoria, silica-alumina-zirconia, silica-alumina-magneia and silica-magnesia-zirconia. The relative proportions of finely divided crystalline material and inorganic oxide gel matrix vary widely, with the crystal content ranging from about 1 to about 90 percent by weight.

In order to more fully illustrate the nature of the invention and the manner of practicing same, the following non-limiting examples are presented below.

EXAMPLE 1

This example illustrates the synthesis of ZSM-5 zeolite with disodium ethoxylated alcohol half ester of sulfosuccinic acid having a formula weight, F.W., of 632 (available commercially under the name of Aerosol A-102 from the American Cyanamid Co.).

To 2.43 grams of aluminum sulfate, $Al_2(SO_4)_3 \cdot 16H_2O$, were added, first, 121 grams of distilled water, then 3.0 grams of concentrated (96%) $H_2SO_4$. This mixture was stirred at room temperature until all the aluminum sulfate dissolved. To this solution, 18.9 grams of Aerosol A-102 (31% aqueous) was added and stirring was continued for another five minutes. This solution was then transferred to a 300 ml stainless steel autoclave.

To the solution in the autoclave, 50.0 grams of Q-broad sodium silicate was added with stirring. The hydrogel which formed was stirred vigorously with a spatula for two minutes, until it had a uniform consistency, then the autoclave was sealed and stirring and heating begun.

The reaction mixture was maintained at 160° C., with stirring, for 120 hours at autogenous pressure. At the end of this period, the autoclave was quenched in an ice-water mixture to terminate the synthesis.

The reaction products from the autoclave were first filtered on a Büchner funnel. After filtration, the crystalline aluminosilicate product was transferred to a beaker of distilled water and boiled on a hot plate for 30 minutes, with stirring, to remove surface adsorbed surfactant.

After this boiling procedure, the aluminosilicate product was again filtered on a Büchner funnel, washed several times with distilled water, and finally dried under an infrared heat lamp in flowing air.

A sample of this dried aluminosilicate product was taken for X-ray analysis. The X-ray powder diffraction pattern of this material identified the crystalline product as zeolite ZSM-5. A sample of the material was also submitted for chemical analysis, the results of which are set forth below in Table IV.

EXAMPLES 2-10

ZSM-5 zeolite was synthesized in these examples in exactly the same manner as in Example 1, except that different reactants, as noted in Table II, below, were used in the synthesis. In some examples, instead of the Aerosol A-102, Aerosol A-103 (also a trademark of and available from the American Cyanamid Co.), which is a disodium ethoxylated nonylphenol half ester of sulfosuccinic acid (F.W.=872) was used as the anionic organic template. Aluminum sulfate, $Al_2(SO_4)_3 \cdot 16H_2O$, or sodium aluminate, $NaAlO_2$, were used as sources of alumina, as noted in Table II. Silica sol (manufactured by Matheson, Coleman and Bell, Manufacturing Chemists, Norwood, Ohio) comprising about 30% by weight of silica, $SiO_2$, and about 70% by weight of water, or Q-brand sodium silicate (manufactured by P.Q. Corporation, P.O. Box 840, Valley Forge, PA 19482), comprising 27.8% by weight of $SiO_2$, 8.4% by weight of $Na_2O$, and the remainder water, were used as sources of silica.

The initial $OH^-/SiO_2$ mole ratio in the reaction mixtures was adjusted with NaOH, when silica sol was employed, and with $H_2SO_4$, when Q-brand sodium silicate was used.

Table II also gives a summary of data of reaction mixture compositions for each example, reaction time and product identification. The zeolite products were identified by X-ray powder diffraction analysis. The lines of the X-ray diffraction pattern of the as-synthesized ZSM-5 zeolite of Example 4 are set forth in Table III. Product compositions, determined by chemical analysis for zeolites of some examples, are set forth in Table IV.

TABLE II

| | Crystallization Of ZSM-5 With Anionic Surfactants | | | | | | | | |
|---|---|---|---|---|---|---|---|---|---|
| | | | | Mixture Composition (Mole Ratios)[a] | | | | Time on | |
| Example | Anionic Surfactant (R) | Silica Source | Alumina Source | $\frac{SiO_2}{Al_2O_3}$ | $\frac{OH^-}{SiO_2}$ | $\frac{Na^+}{SiO_2}$ | $\frac{R}{SiO_2}$ | Stream (Hours) | Product |
| 2 | Aerosol A-102[b] | Silica Sol | $NaAlO_2$ | 90 | 0.20 | 0.22 | 0.02 | 72 | 90% ZSM-5 + α-cristobalite |
| 3 | Aerosol A-102 | Q-brand | $Al_2(SO_4)_3 \cdot 16H_2O$ | 90 | 0.20 | 0.59 | 0.04 | 96 | 100% ZSM-5 |
| 4 | Aerosol A-102 | Q-brand | $Al_2(SO_4)_3 \cdot 16H_2O$ | 90 | 0.20 | 0.59 | 0.08 | 72 | 100% ZSM-5 |
| 5 | Aerosol A-103[c] | Q-brand | $Al_2(SO_4)_3 \cdot 16H_2O$ | 90 | 0.20 | 0.59 | 0.02 | 144 | 80% ZSM-5 + α-cristobalite |
| 6 | Aerosol A-102 | Q-brand | $Al_2(SO_4)_3 \cdot 16H_2O$ | 200 | 0.20 | 0.59 | 0.08 | 72 | 10% ZSM-5 + $SiO_2$ + α-cristobalite |

TABLE II-continued

Crystallization Of ZSM-5 With Anionic Surfactants

| Example | Anionic Surfactant (R) | Silica Source | Alumina Source | Mixture Composition (Mole Ratios)[a] | | | | Time on Stream (Hours) | Product |
| --- | --- | --- | --- | --- | --- | --- | --- | --- | --- |
| | | | | $\frac{SiO_2}{Al_2O_3}$ | $\frac{OH^-}{SiO_2}$ | $\frac{Na^+}{SiO_2}$ | $\frac{R}{SiO_2}$ | | |
| 7 | Aerosol A-102 | Q-brand | $Al_2(SO_4)_3 \cdot 16H_2O$ | 200 | 0.30 | 0.59 | 0.08 | 72 | 25% ZSM-5 + α-cristobalite |
| 8 | Aerosol A-103 | Silica Sol | $NaAlO_2$ | 200 | 0.20 | 0.21 | 0.04 | 72 | 30% ZSM-5 + α-cristobalite |
| 9 | Aerosol A-102 | Q-brand | None | ∞ | 0.30 | 0.59 | 0.04 | 72 | ZSM-14 |
| 10 | Aerosol A-102 | Q-brand | None | ∞ | 0.30 | 0.59 | 0.08 | 72 | α-cristobalite only |

[a] $H_2O/SiO_2 = 40$ in all examples
[b] Aerosol A-102 (31 wt. % aqueous); F.W. = 632
[c] Aerosol A-103 (34 wt. % aqueous); F.W. = 872

TABLE III

| N | d-spacing Å | 2θ | 100I/Io |
| --- | --- | --- | --- |
| 1 | 11.1781 | 7.903 | 43.67 |
| 2 | 10.0299 | 8.809 | 31.37 |
| 3 | 9.7639 | 9.050 | 5.90 |
| 4 | 7.4840 | 11.815 | 2.00 |
| 5 | 7.1437 | 12.380 | 0.95 |
| 6 | 6.7323 | 13.140 | 3.40 |
| 7 | 6.3854 | 13.857 | 6.73 |
| 8 | 6.0063 | 14.736 | 6.73 |
| 9 | 5.7202 | 15.478 | 4.95 |
| 10 | 5.5868 | 15.850 | 5.14 |
| 11 | 5.0350 | 17.599 | 3.00 |
| 12 | 4.6240 | 19.179 | 6.79 |
| 13 | 4.3774 | 20.270 | 11.67 |
| 14 | 4.2719 | 20.776 | 8.81 |
| 15 | 4.1110 | 21.598 | 2.00 |
| 16 | 4.0163 | 22.114 | 3.82 |
| 17 | 3.8615 | 23.013 | 100.00 |
| 18 | 3.8269 | 23.224 | 72.00 |
| 19 | 3.7561 | 23.668 | 32.22 |
| 20 | 3.7305 | 23.833 | 50.39 |
| 21 | 3.6576 | 24.315 | 24.04 |
| 22 | 3.4930 | 25.479 | 5.00 |
| 23 | 3.4488 | 25.812 | 7.52 |
| 24 | 3.3210 | 26.823 | 7.43 |
| 25 | 3.0563 | 29.196 | 10.43 |
| 26 | 2.9956 | 29.801 | 8.81 |
| 27 | 2.9813 | 29.947 | 9.23 |
| 28 | 2.9496 | 30.276 | 3.93 |
| 29 | 2.7385 | 32.673 | 3.07 |
| 30 | 2.6134 | 34.284 | 6.13 |

The data of Table III was obtained in the same manner as the data of Table I. Accordingly, the abbreviations used in Table III have the same meaning as discussed above in connection with the discussion of Table I.

TABLE IV

Chemical Composition of ZSM-5 Samples Synthesized With Anionic Surfactants

| | Sample of | | | | | | |
| --- | --- | --- | --- | --- | --- | --- | --- |
| Example | C (wt. %) | N (wt. %) | Na (wt. %) | $SiO_2$ (wt. %) | $Al_2O_3$ (wt. %) | Ash (wt. %) | $\frac{SiO_2}{Al_2O_3}$ |
| 1 | 4.70 | 0.03 | 1.00 | 80.4 | 2.9 | 88.56 | 47 |
| 2 | 3.55 | 0.03 | 1.15 | 86.4 | 2.3 | 91.7 | 64 |
| 3 | 5.46 | 0.10 | 0.50 | 88.8 | 3.0 | 90.5 | 50 |
| 4 | 6.30 | n.a. | 0.70 | 85.2 | 2.0 | 88.7 | 72 |
| 8 | 1.74 | 0.23 | 0.45 | 93.6 | 1.0 | 96.6 | 159 |

The data of Table II indicates that Aerosol A-102 is a more effective organic template directing agent of the two templates tested. It crystallizes ZSM-5 most efficiently over the $SiO_2/Al_2O_3$ mole ratios of 60 to 90. At the $SiO_2/Al_2O_3$ mole ratios greater than 100, the crystallinities of the ZSM-5 products are generally low (≦30%), and the products are often contaminated with α-cristobalite.

It will be apparent to those skilled in the art that the specific embodiments discussed above can be successfully repeated with ingredients equivalent to those generically or specifically set forth above and under variable process conditions.

From the foregoing specification one skilled in the art can readily ascertain the essential features of this invention and without departing from the spirit and scope thereof can adopt it to various diverse applications.

What is claimed is:

1. A synthetic crystalline ZSM-5 zeolite material having the formula, in terms of mole ratios of oxide, in the anhydrous state as follows:
(0.02–10)$R_2O$:(0.1–2)$M_{2/n}O$:(0.1–3.3)$Al_2O_3$:100$SiO_2$
wherein R is represented by the formula:

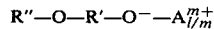

wherein A is a cation having a valence m, R' is a sulfonated succinic acid group and R" is an ethoxylated alkyl group having 8 to 12 carbon atoms in the alkyl chain or an ethoxylated phenol alkyl group having 8 to 12 carbon atoms in the alkyl chain, and M is an alkali metal or an alkaline earth metal having a valence n, and having the X-ray powder diffraction pattern substantially as set forth in Table I of the specification.

2. A zeolite of claim 1 wherein M is sodium.

3. A zeolite of claim 2 wherein A is sodium, and R" is either

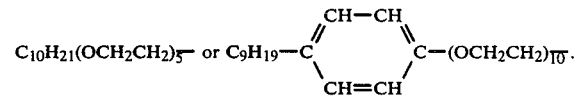

4. A zeolite of claim 3 wherein R" is $C_{10}H_{21}(OCH_2CH_2)_5$—.

5. A zeolite of claim 4 wherein R' is

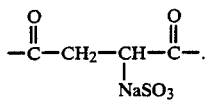

6. A process for preparing a synthetic crystalline ZSM-5 zeolite material of claim 1 which comprises preparing a reaction mixture comprising sources of an alkali or alkaline earth metal, alumina, silica and an organic, anionic directing agent represented by the formula:

$$R''—O—R'—O^- —A_{l/m}^{m+}$$

wherein A is a cation having a valence m, R' is a sulfonated succinic acid moiety, and R'' is an ethoxylated alkyl group having 8 to 12 carbon atoms in the alkyl claim or an ethoxylated phenol group having 8 to 12 carbon atoms in the alkyl chain, and having the following composition in terms of mole ratios of oxides
$SiO_2/Al_2O_3 = 30-1000$
$H_2O/SiO_2 = 2-1000$
$OH^-/SiO_2 = 0-10$
$M^+/SiO_2 = 0.01-3$
$R/SiO_2 = 0.01-3$ wherein M is a an alkali or alkaline earth metal and R is the anionic directing agent and maintaining it at crystallization conditions until the crystals of the ZSM-5 zeolite of claim 1 are formed.

7. A process of claim 6 wherein M is sodium.

8. A process of claim 7 wherein A is sodium, and R'' is either

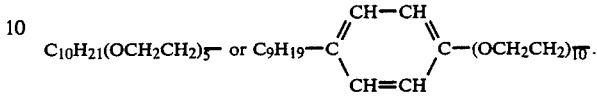

9. A process of claim 8 wherein R'' is $C_{10}H_{21}(OCH_2CH_2)_5$—.

10. A process of claim 9 wherein R' is

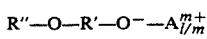

11. A process of claim 10 wherein the molar ratio $SiO_2/Al_2O_3$ is 60 to 90.

12. A process of claim 11 wherein the molar ratio of $SiO_2/Al_2O_3$ is 90.

* * * * *

UNITED STATES PATENT AND TRADEMARK OFFICE
CERTIFICATE OF CORRECTION

PATENT NO. : 4,557,917

DATED : December 10, 1985

INVENTOR(S) : Ernest W. Valyocsik and Eric G. Derouane

It is certified that error appears in the above-identified patent and that said Letters Patent is hereby corrected as shown below:

Column 1, line 8, change "crystallin" to --crystalline--.

Column 2, line 55, change "or" first occurrence to --of--.

Column 2, line 60, change "meal" to --metal--.

Column 5, lines 9 and 10, change "characteristics" to --characteristic--.

Column 6, line 59, change "aforesaid" to --aforenoted--.

Column 8, line 28, change "molbydenum" to --molybdenum--.

Column 8, line 33, change "intinately" to --intimately--.

Column 9, line 23, change "composing" to --compositing--.

Column 9, line 31, change "magneia" to --magnesia--.

Column 9, line 56, change "broad" to --brand--.

Column 14, line 1, delete the word "a".

Signed and Sealed this

Twenty-second Day of April 1986

[SEAL]

Attest:

DONALD J. QUIGG

Attesting Officer

Commissioner of Patents and Trademarks